United States Patent [19]

Musser et al.

[11] Patent Number: 4,851,705
[45] Date of Patent: Jul. 25, 1989

[54] FIRING CIRCUIT FOR A VEHICLE PASSENGER RESTRAINT SYSTEM

[75] Inventors: Kevin E. Musser, Farmington; Craig W. White, Grosse Pointe, both of Mich.

[73] Assignee: Automotive Systems Laboratory, Inc., Farmington Hills, Mich.

[21] Appl. No.: 249,366

[22] Filed: Sep. 23, 1988

[51] Int. Cl.$^4$ ............................................. B60R 21/00
[52] U.S. Cl. .................................. 307/10.1; 280/735; 180/282
[58] Field of Search ................. 307/10 R, 9; 280/735; 180/282; 340/52 H, 53

[56] References Cited

U.S. PATENT DOCUMENTS

| | | | |
|---|---|---|---|
| 3,921,129 | 11/1975 | Sumida | 340/52 H |
| 4,166,641 | 9/1979 | Okada et al. | 280/735 |
| 4,243,248 | 1/1981 | Scholz et al. | 280/735 |
| 4,381,829 | 5/1983 | Montaron | 180/282 X |
| 4,384,734 | 5/1983 | Yasui | 180/282 X |
| 4,438,424 | 3/1984 | Yasui | 340/52 H |
| 4,614,876 | 9/1986 | Mattes et al. | 307/10 R X |
| 4,695,075 | 9/1987 | Kamiji et al. | 280/735 |
| 4,804,859 | 2/1989 | Swartz | 307/10 R X |

Primary Examiner—William M. Shoop, Jr.
Assistant Examiner—Sharon D. Logan
Attorney, Agent, or Firm—Lyman R. Lyon

[57] ABSTRACT

A firing circuit for deploying a pair of air bags comprises two circuit legs connected in parallel across a voltage supply. Each circuit leg comprises in series a safing sensor, a squib, and a crash sensor, with each sensor being shunted by a like resistor having a nominal resistance substantially greater than the nominal resistance of the squibs. Two separate diode bridges, each comprising a pair of oppositely biased diodes, bridge the circuit legs at junctions thereon between the safing sensors and the squibs, and the squibs and the crash sensors, respectively, to provide multiple firing paths for both squibs. A microprocessor checks the integrity of the firing circuit and diagnoses the presence of faults therein by reading the voltage potentials at each junction; comparing the voltage potential at one or more junctions with the supply voltage; comparing the voltage drop across the diode bridges with the diode forward-biased conduction voltages; and, if a specific fault has not yet been identified, determining the effect on the voltage potential at one or more junctions when increasing the supply voltage applied across the firing circuit. The microprocessor periodically determines the instantaneous forward-biased conduction voltages of the bridging diodes for use in the above diagnostic sequence by operating a current switch connected to a junction on each circuit leg and determining the resulting voltage drops across the diode bridges.

22 Claims, 2 Drawing Sheets

FIRING CIRCUIT FOR A VEHICLE PASSENGER RESTRAINT SYSTEM

BACKGROUND OF THE INVENTION

The instant invention relates to vehicle passenger restraint systems and, more specifically, to a firing circuit for an air bag passive restraint system which can be readily diagnosed for the presence of faults therein.

Known air bag passenger restraint systems comprise a firing circuit having a voltage supply providing a potential across a firing squib in series with a first and second normally open vehicle acceleration sensor, each of which is shunted by a resistor of like nominal resistance. A small current thus flows through the circuit while the sensors remain in the normally open condition. The closure of the sensors upon collision or marked deceleration of the vehicle generates a significant rise in the current flowing through the squib which, in turn, fires the squib to deploy the air bag. In order to accommodate both driver and passenger air bags, a separate firing circuit is employed for each air bag, each firing independently during a vehicle collision.

An advantage of such separate firing circuits is that the presence of a fault therein, i.e., a component failure such as the improper closure of one of the normally open sensors, is readily diagnosable by measuring the voltage potentials about the circuit. Unfortunately, since each squib is connected to only two sensors, there are no redundant fire paths for the squibs. Thus all four sensors must close in order to deploy both bags. Redundant fire paths can be created by adding additional dedicated series firing circuits for each air bag. Each air bag would thus have two or more squibs which deploy the bag upon closure of both sensors dedicated to one of the squibs, with the number of redundant fire paths therefore being equal to the number of redundant series firing circuits. Unfortunately, the resultant increase in the number of circuit elements dramatically increases both the cost of a passenger restraint system employing such circuits and the likelihood of failure of such circuit elements.

Another known air bag firing circuit offers multiple firing paths by placing in series a first pair of normally open sensors wired in parallel, a pair of squibs wired in parallel, and a second pair of normally open sensors, also wired in parallel. The sensors are again shunted by resistors of like nominal resistance. The squibs fire upon simultaneous closure of either of the first pair of sensors and either of the second pair of sensors. The provision of multiple firing paths thus increases system reliability without the need for increasing the number of circuit elements used therein. Unfortunately, such circuits are not readily diagnosable—although the examination of voltage potentials about the circuit would indicate that a fault had occurred, there is no way to identify the precise fault, short of removing and testing each circuit element individually until the source of the fault is revealed. For example, upon the failing closed of one of the sensors comprising the first pair of sensors, both sensors must be removed and individually tested to determine which of the sensors had failed.

SUMMARY OF THE INVENTION

It is an object of the instant invention to provide a firing circuit for a vehicle passenger restraint system having multiple firing paths while employing a minimum number of circuit elements Another object of the instant invention is to provide a firing circuit for a vehicle passenger restraint system, the elements of which may be diagnosed without necessitating the disassembly of the firing circuit.

A further object of the instant invention is to provide a method for specifically diagnosing any fault present in the instant firing circuit which does not require the disassembly thereof.

The instant firing circuit for actuating a first and second instrumentality of a vehicle passenger restraint system, e.g., for deploying a pair of air bags, comprises first and second circuit legs connected in parallel across a voltage supply, whereby a first voltage is applied thereacross. Specifically, the first circuit leg comprises in series a first normally open sensor for detecting a first condition requiring deployment of the air bags (hereinafter "safing sensor"), a first trigger means such as a squib for deploying the first air bag having an internal resistance, and a second normally open sensor for detecting a second condition requiring deployment of the air bags (hereinafter "crash sensor"). Similarly, the second circuit leg comprises in series another safing sensor, a second squib for deploying the second air bag having an internal resistance substantially equal to the internal resistance of the first squib, and another crash sensor. Each of the normally open safing and crash sensors are shunted by a resistor having a resistance substantially greater than the internal resistance of each squib. The resistors shunting the crash and safing sensor of the first and second circuit legs, respectively, are of like nominal resistance. Alternatively, the resistors shunting the safing sensor of each circuit leg, and the resistors shunting the crash sensor of each circuit leg, respectively, are of like nominal resistance.

A first diode bridge comprising a pair of oppositely biased diodes connects a first junction on the first circuit leg located between the safing sensor and the squib thereof with a first junction on the second circuit leg located between the safing sensor and squib thereof. Similarly, a second diode bridge comprising a pair of oppositely biased diodes connects a second junction on the first circuit leg located between the squib and crash sensor thereof with a second junction on the second circuit leg located between the squib and crash sensor thereof. The diode bridges provide multiple firing paths for the squibs, whereby both squibs are fired and, hence, both air bags are deployed, upon closure of either safing sensor and either crash sensor.

The diode bridges additionally permit the diagnosing of the presence of a fault in the instant firing circuit in situ, as well as permitting the identification of the fault. To that end, the instant firing circuit further comprises means for reading the voltage potentials at several of the junctions thereabout and the voltage applied across the circuit legs; means for comparing the voltage potentials of the several junctions with each other; means for calculating a plurality of voltage ranges from the applied voltage and a plurality of known percentages of the applied voltage, and means for comparing the voltage potential at one of the junctions with the thus calculated voltage ranges; means for applying a second voltage across the circuit legs greater than the first applied voltage, i.e., for increasing the voltage applied thereacross, and means for comparing the voltage potential at one of the junctions upon application of the first voltage across the circuit legs with the voltage potential a the same junction when the second voltage is applied thereacross; and means for comparing the voltage drop across each of the diode bridges with the diode forward-biased conduction voltages.

The instant firing circuit further comprises signal means for signalling the presence of the fault, and means for recording the fault, upon the diagnosis thereof. Additionally, the instant firing circuit comprises mean for determining the instantaneous forward-biased conduction voltages of the diodes comprising the diode bridges, such as switchable means for drawing current from each of the circuit legs and means for calculating the resultant voltage drop across each of the diode bridges, whereby the firing circuit periodically redetermines the forward-biased conduction voltage of the diodes so as to account for manufacturing tolerances as well as the effects of time and temperature thereon.

DETAILED DESCRIPTION OF THE PREFERRED EMBODIMENTS OF THE INVENTION

Figure 1:
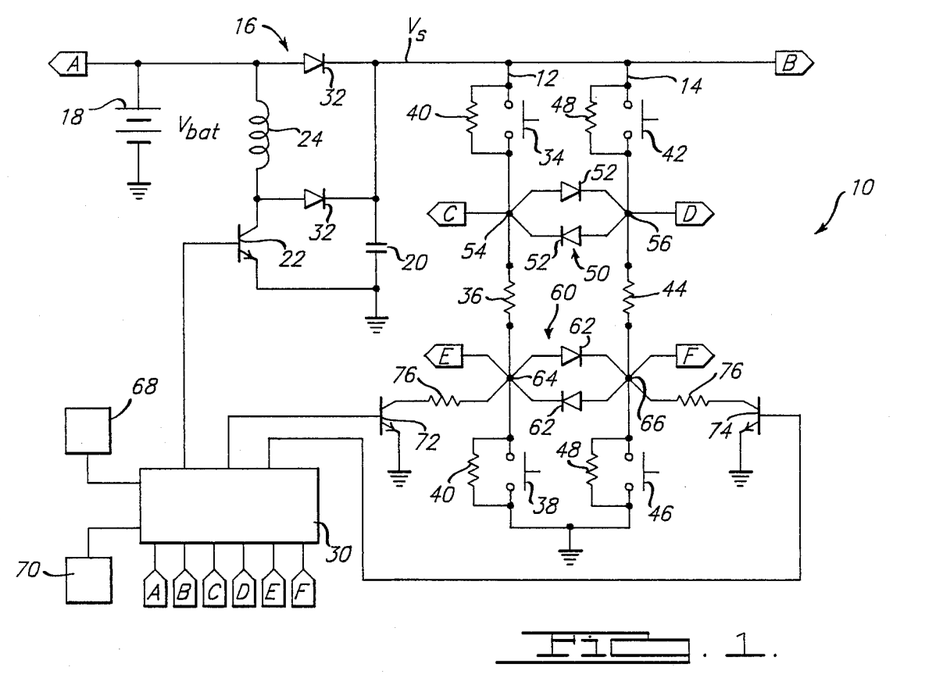
FIG. 1 is a diagrammatic schematic of an air bag firing circuit constructed in accordance with the instant invention.

Referring to FIG. 1, a firing circuit 10 constructed in accordance with the instant invention for deploying a pair of air bags (not shown) comprises a first and second circuit leg 12 and 14 connected in parallel across a DC power supply 16. The DC power supply 16 comprises, for example, a battery 18 and a capacitor 20 connected across the battery 18 and normally charged thereby, whereby the supply voltage $V_s$ delivered across the circuit legs 12 and 14 remains sufficient to deploy the air bags in the event that the battery 18 malfunctions or is otherwise isolated from legs 12 and 14 of the firing circuit 10 during a vehicle collision. Alternatively, the capacitor 20 is charged to the nominal supply voltage $V_s$ by the pulsed output of a charging transistor 22 with the aid of an inductor 24. The input to the charging transistor 22 comprises the pulsed output of a microprocessor 30 which continuously monitors the output voltage $V_{bat}$ of the battery 18 and the supply voltage $V_s$ applied across the circuit legs 12 and 14 by means of a pair of analog-to-digital converter ports A and B thereon, respectively. A pair of protecting diodes 32 prevent the premature discharge of the capacitor 20. It is noted that the capacitor 20 further serves to momentarily increase the supply voltage $V_s$ applied across the legs 12 and 14 of the firing circuit 10 for use in diagnosing the presence of faults therein, as described hereinbelow.

The first circuit leg 12 comprises in series a normally open safing sensor 34 for detecting a first condition requiring the deployment of the air bags, such as an acceleration which exceeds a first threshold value; a trigger means for deployment of the first air bag, such as a firing squib 36 therefor comprising a heating wire of nominal internal resistance which explosively deploys the first air bag when the current flowing therethrough exceeds a threshold value: and a normally open crash sensor 38 for detecting a second condition requiring the deployment of the air bags, such as an acceleration which exceeds a second threshold value. The second acceleration threshold of the crash sensor 38 is higher than the first acceleration threshold of the safing sensor 34, whereby the safing sensor 34 effectively "arms" the crash sensor 38, and the thus armed crash sensor 38 fires the squib 36 upon the acceleration of the vehicle at a rate which exceeds the second threshold value thereof.

The normally open sensors 34 and 38 of the first circuit leg 12 are each shunted by a resistor 40 of like nominal resistance. Significantly, the nominal resistance of the shunting resistors 40 is preferably several orders of magnitude larger. than the nominal internal resistance of the squib 36. For example, where the nominal internal resistance of the squib 36 is about 2 ohms, the shunting resistors 40 preferably comprise 2 k resistors.

Similarly, the second leg 14 of the firing circuit 10 comprises in series a second safing sensor 42 having a like acceleration threshold as the safing sensor 34 of the first circuit leg 12; a second squib 44 having a like internal resistance as that of the first squib 36 for deployment of the second air bag when the current flowing therethrough exceeds a threshold value; and a second crash sensor 46 having a like acceleration threshold as the crash sensor 38 of the first circuit leg 12. The safing sensor 42 and the crash sensor 46 of the second circuit leg 14 are each shunted by a resistor 48 of like nominal resistance as the shunting resistors 40 of the first circuit leg 12.

A first diode bridge 50 comprising oppositely biased diodes 52 connects a junction 54 on the first leg 12 between the safing sensor 34 and the squib 36 thereof (hereinafter the "first junction 54") with a junction 56 on the second leg 14 between the safing sensor 42 and the squib 44 thereof (hereinafter the "second junction 56"). Similarly, a second diode bridge 60 comprising oppositely biased diodes 62 connects another junction 64 on the first circuit leg 12 between the squib 36 and the crash sensor 38 thereof (hereinafter the "third junction 64") with another junction 66 on the second circuit leg 14 between the squib 44 and the crash sensor 46 thereof (hereinafter the "fourth junction 66").

The diode bridges 50 and 60 provide multiple firing paths for the squibs 36 and 44, whereby both air bags are deployed regardless of which combination of safing sensor and crash sensor closures occur. More specifically, under normal operation, the shunting resistors 40 and 48 maintain a relatively low current flow through each circuit leg 12 and 14, and, hence, through the squibs 36 and 44 thereof. Upon the closure of at least one of the safing sensors 34 and 42 and at least one of the crash sensors 38 and 46 due to an acceleration exceeding the threshold values thereof, the shunting resistors 40 and 48 are shorted, whereby the current flowing through both squibs 36 and 44 is increased to a value above the firing threshold thereof, whereupon the air bags are simultaneously deployed.

In accordance with another feature of the instant invention, the diode bridges 50 and 60 of the instant firing circuit 10 additionally permit the diagnosing of faults therein. More specifically, during normal operation, the firing circuit 10 functions as a simple parallel circuit having two legs 12 and 14 of identical resistance which, hence, draw an identical current. Therefore, during normal operation, the first and second junctions 54 and 56, and the third and fourth junctions 64 and 66, respectively, are maintained at like potentials. However, the presence of a fault within the circuit 10 disrupts the current flow through the legs 12 and 14 thereof, thereby altering the voltage potentials at one or more of the junctions. Since each fault affects the circuit and, hence, the junction voltage potentials in a different manner, the identity of the fault may be determined upon examination of the absolute and relative values of the voltage potentials at the junctions 54, 56, 64, and 66.

Accordingly, the instant firing circuit 10 further comprises means for reading the voltage potentials at each junction 54, 56, 64, and 66, such as analog-to-digital converter ports "C", "D", "E", and "F" on the microprocessor 30 which are connected thereto, respectively. The firing circuit 10 further comprises a non-volatile memory unit such as an EEPROM 68 connected with the microprocessor 30 for storing a plurality of reference values useful in diagnosing the presence of faults, and wherein the frequency and identity of such diagnosed faults are recorded for subsequent review; and signal means, such as signal lamp 70, actuated by the microprocessor 30, whereby the presence of a fault is indicated to the vehicle operator. It is noted that, where the instantaneous voltage drop across either diode bridge 50 and 60 exceeds the forward-biased conduction voltage $V_d$ of the diodes 52 and 62 thereof, the forwardly-biased diode of the bridge 50 and 60 "turns on," i.e., a current will begin to flow therethrough, whereafter the voltage drop across the bridge 50 and 60 is limited to the diode forward-biased conduction voltage $V_d$. Where the voltage across the bridge 50 and 60 exceeds the forward-biased conduction voltage $V_d$ of the diodes 52 and 62 thereof, a diode fault is indicated, as discussed hereinbelow.

Figure 2:
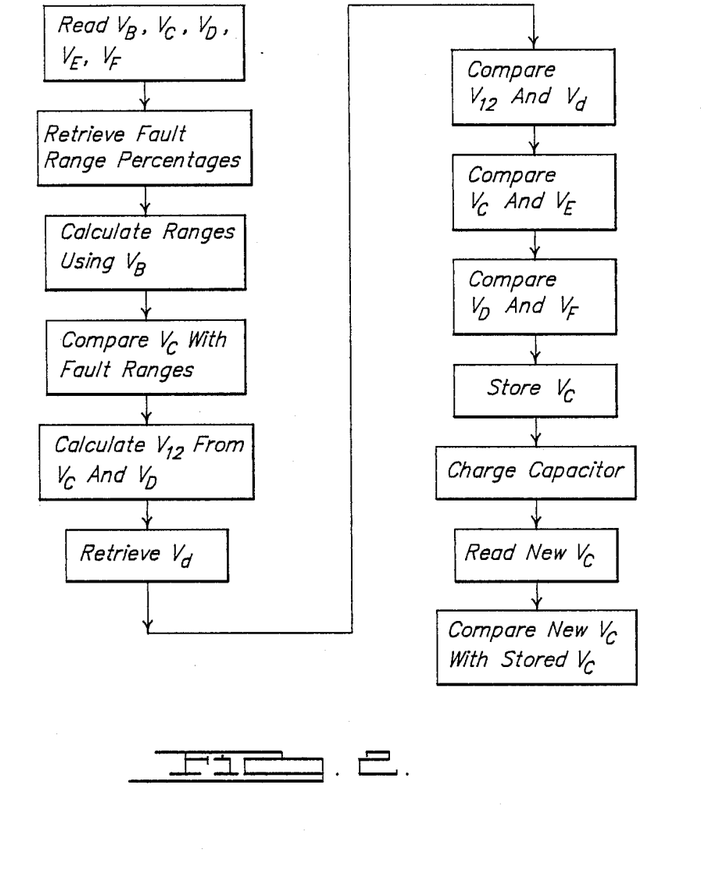
FIG. 2 is a flow chart illustrating a method for diagnosing the presence of a fault in the air bag firing circuit of FIG. 1, as executed by the microprocessor thereof.

The diagnostic sequence executed by the microprocessor 30 is shown schematically in FIG. 2. Specifically, the microprocessor 30 diagnoses the presence, if any, of a fault in the firing circuit 10 by: (1) reading the instantaneous supply voltage $V_s$ and the voltage potentials at the junctions 51, 56, 64, and 66 via analog-to-digital converter ports "B", "C", "D", "E", and "F" thereon, respectively; (2) retrieving from the EEPROM 68 a plurality of range percentages previously recorded therein which define ranges of junction voltage potentials with respect to the supply voltage $V_s$ corresponding to various groupings of possible circuit faults; (3) calculating five voltage ranges using the above percentages and the instantaneous supply voltage $V_s$; and (4) determining the presence and identity of any specific fault based on: (a) the voltage range in which the voltage potential $V_1$ at the first junction 54 lies; (b) the voltage drop $V_{12}$ between the first and second junctions 54 and 56 in comparison with a reference diode forward-biased conduction voltage $V_d$ retrieved from the EEPROM 68; (c) the voltage drops between the first and third junctions 54 and 64, and the second and fourth junctions 56 and 66, respectively; and (d) the effect that charging the capacitor 20 to a voltage higher than the instantaneous supply voltage $V_s$ used above has on the voltage potential $V_1$ of the first junction 54. If a fault is indicated, the microprocessor 30 thereafter records the indicated fault in the EEPROM 68 and empowers the signal lamp 70. It is noted that the fault range percentages may be alternately imbedded in the set of instructions to be executed by the microprocessor 30, whereby reference need no longer be made to the EEPROM 68 to obtain such values.

The fault range percentages retrieved from the EEPROM 68 in step (2) above are initially determined by circuit analysis in a manner known to those skilled in the art, whereby the likely change in voltage potentials at the junctions 54, 56, 64 and 66, respectively, in response to each possible fault is calculated. The percentages thus obtained are then empirically broadened to provide fault voltage ranges which accommodate allowable variations in the electrical characteristics of the elements comprising the firing circuit 10. Thus, for an exemplary embodiment of the instant firing circuit 10 having 2k shunting resistors 40 and 48, Range 1 lies between ground and 16.5% of the supply voltage $V_s$; Range 2 between 16.5% and 46% of the supply voltage $V_s$; Range 3 between 46% and 58% of the supply voltage $V_s$; Range 4 between 58% and 79% of the supply voltage $V_s$; and Range 5 between 79% and 100% of the supply voltage $V_s$. Indeed, the above percentages hold true for any embodiment in which the shunting resistors 40 and 48 are of like nominal resistance and the nominal internal resistance of the squibs 36 and 44 is negligible when compared therewith.

The observed voltage drops $V_{12}$, $V_{13}$, and $V_{24}$ developed between the first and second junctions 54 and 56, the first and third junctions 54 and 64, and the second and fourth junctions 56 and 66, respectively, are used in combination with the above fault ranges to identify twenty-six specific faults, or to confirm the absence of faults in the circuit 10, as indicated in the following Table, wherein "nil" represents a voltage of negligible amplitude:

TABLE I

|  | Fault No. | Fault Description | $V_{12}$ | $V_{13}$ | $V_{24}$ | $\Delta V_1$ Upon Inc. $V_s$ |
|---|---|---|---|---|---|---|
|  | 1. | J3 short to $V_s$ | $+V_d$ | — |  | + |
|  | 2. | SS1 closed. | $+V_d$ | + |  | + |
|  | 3. | J1 short to $V_s$ | $+V_d$ | + |  | 0 |
|  | 4. | J4 short to $V_s$ | $-V_d$ |  | — |  |
|  | 5. | SS2 closed. | $-V_d$ |  | + | + |
| Range 5 | 6. | J2 short to $V_s$ | $-V_d$ |  | + | 0 |
|  | 7. | Squibs 1 & 2 open | nil | $+V_s$ |  | + |
|  | 8. | SS1 & 2 closed | nil | + |  | + |
|  | 9. | J1 & 2 short to $V_s$ | nil | + |  | 0 |
|  | 10. | Open between J3 & 4 and gnd. | nil | 0 |  | + |
|  | 11. | J3 & 4 short to $V_s$ | nil | 0 |  | 0 |
|  | 12. | Open between J3 and gnd. | $+V_d$ |  |  |  |
| Range 4 | 13. | Open between J4 and gnd. | $-V_d$ |  |  |  |
|  | 14. | Measurement error | $-V_d<V_{12}<+V_d$ |  |  |  |
|  | 15. | Squib 1 open | $+V_d$ |  |  |  |
| Range 3 | 16. | Squib 2 open | $-V_d$ |  |  |  |
|  | 17. | Resistor out of range | $-V_d<V_{12}<-g$, or $+g<V_{12}<+V_d$ |  |  |  |
|  | — | No fault present | nil |  |  |  |
| Range 2 | 18. | Open between J1 and $V_s$ | $+V_d$ |  |  |  |
|  | 19. | Open between J3 and $V_s$ | $-V_d$ |  |  |  |
|  | 20. | Measurement error | $-V_d<V_{12}<+V_d$ |  |  |  |
|  | 21. | CS2 closed, or J4 short to gnd. | $+V_d$ | + |  |  |
|  | 22. | J1 short to gnd. | $+V_d$ | 0 |  |  |
| Range 1 | 23. | CS1 closed, or J2 short to gnd. | $-V_d$ |  |  | + |
|  | 24. | J2 short to gnd. | $-V_d$ |  |  | 0 |
|  | 25. | CS1 & 2 closed, or J3 & 4 short to |  |  |  |  |

TABLE I-continued

| Fault No. | Fault Description | $V_{12}$ | $V_{13}$ | $V_{24}$ | $\Delta V_1$ Upon Inc. $V_s$ |
|---|---|---|---|---|---|
|  | gnd. | nil |  |  | + |
| 26. | J1 & 2 short to gnd. or open between |  |  |  |  |
|  | J1 & 2 and $V_s$ | nil |  |  | 0 |

Wherein:
SS1 - Safing sensor 34 of first circuit leg 12
SS2 - Safing sensor 42 of second circuit leg 14
CS1 - Crash sensor 38 of first circuit leg 12
CS2 - Crash sensor 46 of second circuit leg 14
J1-J4 - Junctions 54, 56, 64, and 66, respectfully
$V_d$ - The instantaneous forward-biased conduction voltage of diodes 52 and 62 comprising diode bridges 50 and 60
g - A specified guard band, for example, 0.3 volts, to accommodate variation in the nominal resistance of circuit components and, thus, prevent inadvertent registering of faults when the circuit is fault free The following examples serve to illustrate application of the above diagnostic sequence, as well as illustrating the use of Table I. For each example, the supply voltage $V_s$ is 12 volts and, thus, the Ranges 1-5 as calculated under step (2) above are as follows: Range 1, 0.0 to 1.98 volts; Range 2, 1.98 to 4.86 volts: Range 3, 4.86 to 6.88 volts: Range 4, 6.88 to 9.42 volts; and Range 5, 9.42 to 12.0 volts. It is assumed, for the following examples, that the diode forward-biased conduction voltage $V_d$ has been found to be 0.70 volts.

EXAMPLE 1

The voltage potentials at the first, second, third and fourth junctions 54, 56, 64, and 66 are determined to be 12.00, 12.00, 11.98, and 11.99 volts, respectively. Given the 12 volt supply voltage, the first junction potential $V_1$ falls within Range 5. Since the voltage drop $V_{12}$ between the first and second junctions 54 and 56 is zero, initial reference to Table I using only $V_{12}$ identifies the following possible fault conditions: both squibs 36 ad 44 are open (fault no. 7); both safing sensors 34 and 42 are closed (fault no 8); the first and second junctions 54 and 56 are both shorted to the positive terminal of the battery 18 (fault no. 9); the circuit legs 12 and 14 are open between the third junction 64 and ground, and between the fourth junction 66 and ground, respectively, (fault no. 10); or both the third and the fourth junctions 64 and 66 of the firing circuit 10 are shorted to the positive terminal of the battery 18 (fault no. 11).

Further reference to Table I requires examination of the voltage drop $V_{13}$ between the first and third junctions 4 and 64. In the instant example, a small positive voltage drop $V_{13}$ of 0.02 volts occurs between the first and third junctions 54 and 64, and thus fault nos. 7, 10, and 11 do not apply—fault no. 7 would have generated a voltage drop $V_{13}$ therebetween equivalent to the supply voltage $V_s$ (i.e., 12 volts), and fault nos. 10 and 11 would both have generated like voltage potentials at the junctions 54 and 64.

To further differentiate between fault nos. 8 and 9, the capacitor 20 is charged by turning on charging transistor 22. If such charging produces an increase in the voltage potential at the first junction 54, then reference to Table II indicates that both safing sensors 34 and 42 are closed (fault no. 8). If such charging fails to produce an increase in the voltage potential at the first junction 54, then the first and second junctions 54 and 56 are shorted to the battery 18 (fault no. 8).

Alternatively, the microprocessor 30 can compare the battery voltage $V_{bat}$ with the voltage potential at the first junction $V_1$ via analog-to-digital convertor ports "A" and "C" on the microprocessor 30 that are connected therewith, respectively Specifically, where the first and second junctions 54 and 56 are not shorted to the battery 18, a voltage drop substantially equal to the forward-biased conduction voltage $V_d$ of voltage supply diode 32 is experienced between the battery 18 and the first junction 54. Where the battery voltage $V_{bat}$ is substantially equal to the voltage potential at the first junction 54, the first and second junctions 54 and 56 are shorted to the battery 18, i.e., fault no. 8 is indicated.

It is noted that, where the voltage drops $V_{13}$ and $V_{24}$ are unavailable, as where the voltage potentials at only the first and second junctions 54 and 56 are read by the microprocessor 30, the specific fault in this example cannot be identified. Rather, the fault may only be characterized as being within two groups of faults, namely, either in the group comprising fault nos. 7, 8, and 10, or in the group comprising fault nos. 9 and 11.

EXAMPLE 2

The voltage potentials at the first, second, third and fourth junctions 54, 56, 64, and 66 are determined to be 11.98, 12.00, 11.28, and 11.30 volts, respectively. The first junction potential thus falls within Range 5. Initial reference to Table I using $V_{12}$ indicates the following possible fault conditions: the first junction 54 is shorted to the positive terminal of the battery 18 (fault no. 1); the first safing sensor 34 is closed (fault no. 2)- or the third junction 64 is shorted to the positive terminal of the battery 18 (fault no 3). Further reference to Table I using the small negative voltage drop $V_{13}$ present between the first and third junctions 54 and 64 indicates that the first junction 54 is shorted to the positive terminal of the battery 18 (fault no. 1).

EXAMPLE 3

The voltage potentials at the first, second, third and fourth junctions 54, 56, 64, and 66 are determined to be 6.10, 6.10, 6.06, and 6.07, respectively. The first junction potential thus falls within Range 3. Since the first and second junctions 54 and 56 are of equal voltage potential, there is no fault present within the circuit 10.

EXAMPLE 4

The voltage potentials of the first, second, third and fourth junctions 54, 56, 64, and 66 are determined to be 5.97, 6.12, 5.93, and 6.10 volts, respectively. The first junction potential thus falls within Range 3. In as much as the voltage drop $V_{12}$ of $-0.15$ volts between the first and second junctions 54 and 56 is significantly less than the diode forward-biased conduction voltage $V_d$, at least one of the shunting resistors 40 and 48 in the circuit 10 has a nominal resistance outside of the acceptable range therefor (fault no. 17).

It is noted that, by adding an additional diode (not shown) in each circuit leg 12 and 14 in between the crash sensor 38 and 46 thereof and ground, further differentiation between the alternate conditions within fault nos. 21, 23, and 25 may be made. More specifically, the second and fourth junctions 64 and 66 are not shorted to ground where the voltage potentials thereof are equal to the forward-biased conduction voltage $V_d$ of such additional resistors. In contrast, a short to ground is indicated where the voltage potentials of the second and fourth junctions 64 and 66 are zero. However, the presence of such additional diodes in the circuit legs 12 and 14 alters the above fault range percentages and, hence, the fault ranges applicable for circuit diagnosis, due to the forward-biased conduction voltage $V_d$ thereof.

Similarly, a resistor (not shown) having a resistance substantially greater than either of the resistors 40 and 48 shunting the crash sensors 34 and 42 may also shunt each crash sensor 34 and 42, whereby further differentiation between the alternate conditions within fault no 26 may be made.

It is further noted that the forward-biased conduction voltage $V_d$ of a given diode varies both as a result of manufacturing tolerances and the operating conditions to which the diode is exposed, e.g., variations in the operating temperature thereof. Thus, in order to accurately diagnose a fault within the firing circuit 10, the instantaneous forward-biased conduction voltage $V_d$ of each diode 52 and 62 in the firing circuit 10 is preferably periodically redetermined for use in the above diagnostic sequence. Accordingly, the firing circuit 10 of the instant invention further comprises current switch means, such as transistors 72 and 74, connected to the third and fourth junctions 64 and 66, respectively, for selectively drawing current from the circuit legs 12 and 14 thereof, as illustrated in FIG. 1. More specifically, the collector of each transistor 72 and 74 is connected to the third and fourth junctions 64 and 66, respctfully, via a resistor 76 of like resistance as the shunting resistors 40 and 48, with the emitter of each transistor 72 and 74 being connected to ground.

Figure 3:
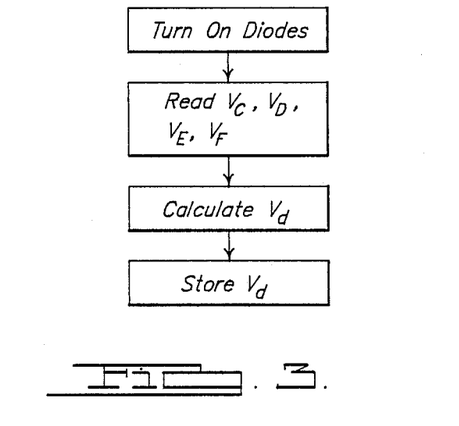
FIG. 3 is a flow chart illustrating a method for determining the instantaneous forward-biased conduction voltages of the diodes comprising the diode bridges of the airbag firing circuit of FIG. 1.

The method for determining the instantaneous forward-biased conduction voltages $V_d$ of the diodes 52 and 62 comprising the diode bridges 50 and 60 is illustrated in FIG. 3. Specifically, a current is supplied to the base of the first transistor 72 from the microprocessor 30, thereby drawing current through the resistor 76 connected to the collectors thereof. An increased current thus flows through the leg 12 to which the empowered transistor 72 is connected which, in turn, results in a larger potential drop across the safing sensor 34 thereof to provide a voltage drop across the forwardly-biased diodes of each bridge 50 and 60 sufficient to turn the diodes "on." The resultant voltage drops $V_{13}$ and $V_{24}$ between the first and second junctions 54 and 56, and the third and fourth junctions 64 and 66, respectively, as calculated from the instantaneous junction voltage potentials read by the microprocesor 30 via analog-to-digital convertor ports "C", "D", "E", and "F" thereon, equal the instantaneous values of the forward-biased conduction voltages of the diodes 52 and 62. The above method is repeated with the second transistor 74 drawing current from the second leg 14, whereby the instantaneous forward-biased conduction voltage Vd of each of the oppositely-biased diodes 52 and 62 of the bridges 50 and 60 are calculated. The instantaneous forward-biased conduction voltage $V_d$ of each diode 52 and 62 is thereafter stored in the EEPROM 68 for use in the diagnostic sequence described hereinabove.

It is noted that a preselected value for the diode forward-biased conduction voltages $V_d$ is used if the instantaneous voltage drop across the diode cannot be calculated due to transistor or diode malfunction. In this regard, it is further noted that the diode forward-biased conduction voltages $V_d$ can be accurately checked only when there are n faults present in the firing circuit 10 or when the faults present fall within Range 3, as defined hereinabove. Thus, when testing for the instantaneous diode forward-biased conduction voltage $V_d$, if the voltage drop $V_{12}$ calculated from the instantaneous voltage potentials at the first and third junctions 54 and 56 is greater than zero but less than a minimum allowable value therefor, a transistor or diode fault is indicated (fault no. 18).

The instant diagnostic sequence may additionally comprise the steps of: reading the voltage potentials $V_{12}$, $V_{13}$, $V_{23}$, and $V_{34}$ about the firing circuit several times and calculating average values therefrom for use the steps outlined hereinabove; checking the integrity of the signal lamp 70 and empowering a back-up signal means in the event of a failure of the signal lamp 70; signaling the specific fault detected, as by a coded sequence, via the signal lamp 70; reading the output voltage $V_s$ of the battery 18 via analog-to-digital port "A" on the microprocessor 30 and charging the capacitor 20 if the battery voltage $V_{bat}$ falls below the level sufficient to fire both squibs 36 and 44, as may occur, for example, upon malfunction of the battery 18 or the isolation of the battery 18 from the circuit 10 during a vehicle collision; and verifying the physical attachment of the acceleration sensors 34, 40, 42, and 46 to the vehicle frame through the use of additional sensing means therefor (not shown).

Upon the determination of the presence of a fault within the circuit 10, the microprocessor 30 may incorporate means therein, such as incremental counters, for determining whether the indicated fault is a system aberration, such as a momentary closure of one of the safing sensors 34 and 42, or a true fault, such as a sensor which has failed in the closed position. The microprocessor 30 may further incorporate a deadman timer to ensure continued diagnostic capability therein, e.g., to cause the microprocessor 30 to begin at a specific point in the instructions therefor in the event that the microprocessor 30 is tied up by a random external disturbance. The microprocessor 30 instructions may further comprise steps for checking the integrity of the EEPROM 68 connected therewith, and for recording in the EEPROM 68 the purging of the faults recorded therein.

Figure 4:
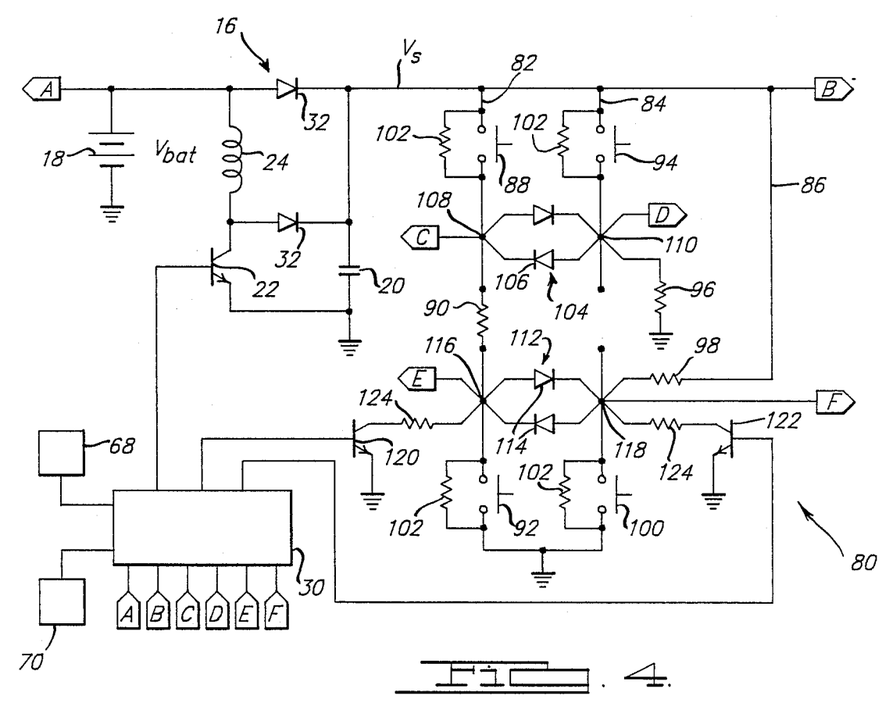
FIG. 4 is an alternate embodiment of the air bag firing circuit of the instant invention for deployment of but a single air bag and featuring multiple firing paths and full circuit diagnosability.

An alternate embodiment 80 of the instant air bag firing circuit is illustrated in FIG. 4. The firing circuit 80 actuates a single air bag, such as a driver's side air bag (not shown), while providing multiple firing paths and full circuit diagnosability. Specifically, the firing circuit 80 comprises three circuit legs 82, 84, and 86 connected in parallel across a voltage supply 16 similar to that described hereinabove with respect to the first embodiment 10 of the instant firing circuit.

The first leg 82 comprises in series a safing sensor 88, a squib 90 for actuating the air bag, and a crash sensor 92; the second leg 84 comprises in series a safing sensor 94 and a resistor 96; and the third leg 86 comprises in series a resistor 98 and a crash sensor 100. As in the first embodiment 10, each sensor 88 and 92 is provided with a shunting resistor 102 of like nominal resistance as series resistors 96 and 98 of the second and third lens 84 and 86, respectively.

A first diode bridge 104 comprised of oppositely biased diodes 106 connects a junction 108 on the first leg 82 between the safing sensor 88 and the squib 90 thereof (hereinafter the "first junction 108") with a junction 110 on the second leg 84 between the safing sensor 94 and the resistor 96 thereof (hereinafter the "second junction 110"). Similarly, a second diode bridge 112 comprising oppositely biased diodes 114 connects another junction 116 on the first circuit leg 82 between the squib 90 and the crash sensor 92 thereof (hereinafter the "third junction 116") with a junction 118 on the third circuit leg 86 between the resistor 98 and the crash sensor 100 thereof (hereinafter the "fourth junction 118"). It is noted that the splitting of the second circuit leg 14 of the first embodiment 10 of the instant firing circuit into two separate circuit legs 84 and 86, as in the second embodiment 80 is necessitated by the fact that the second squib 44 of the first embodiment 10 cannot simply be replaced by a resistor of like nominal resistance upon the removal of the second squib 44 therefrom, as a resistor of such low nominal resistance would catastrophically fail upon the closing of a crash and safing sensor, with the attendant risk of fire or other hazard, in addition to lowering the reliability of the firing circuit.

As in the first embodiment 10 of the instant firing circuit 10, the diode bridges 104 and 112 enable either of the safing sensors 88 and 94 to "arm" both crash sensors 92 and 100. Thus, upon the simultaneous closure of either of the safing sensors 88 and 94 and either of the crash sensors 92 and 100, the current flowing through the squib 90 is increased to a value above the firing threshold thereof, whereupon the squib 90 deploys the air bag. The diode bridges 104 and 112 similarly provide full circuit diagnosability using the diagnostic sequence described hereinabove with respect to the first embodiment 10 of the instant forcing circuit.

The instantaneous forward-biased conduction voltage $V_d$ of each of the diodes 106 and 114 comprising the diode bridges 104 and 112 is calculated in the manner described hereinabove by alternately turning on transistors 120 and 122, the collectors of which are connected via resistors 124 to the third and fourth junctions 116 and 118 of the first and third circuit legs 82 and 86, respectively.

While the preferred embodiments of the invention have been disclosed, it should be appreciated that the invention is susceptible of modification without departing from the scope of the following claims.

We claim:

1. A firing circuit for actuating a first and second instrumentality of a vehicle passenger restraint system comprising
    a first circuit leg comprising in series a first normally open sensor for detecting a first condition requiring actuation of said instrumentalities, a first trigger means having an internal resistance for actuating said first instrumentality, and a second normally open sensor for a second condition requiring actuation of said instrumentalities, said first and second sensor being shunted by a first and second resistor, respectively, said first and second resistors having a resistance substantially greater than the internal resistance of said first trigger means;
    a second circuit leg connected in parallel with said first circuit leg comprising in series a third normally open sensor for detecting the first condition requiring actuation of said instrumentalities, a second trigger means having an internal resistance substantially equal to the internal resistance of said first trigger means for actuating said second instrumentality, and a fourth normally open sensor detecting the second condition requiring actuation of said instrumentalities, said third and fourth sensor being shunted by a third and fourth resistor, respectively, said third and fourth resistors having a resistance substantially greater than the internal resistance of said second trigger means;
    a first diode bridge comprising a pair of oppositely biased diodes connecting a first junction on said first circuit leg between said first sensor and said first trigger means with a first junction on said second circuit leg between said third sensor and second trigger means; and
    a second diode bridge comprising a pair of oppositely biased diodes connecting a second junction on said first circuit leg between said first trigger means and said second sensor with a second junction on said second circuit leg between said second trigger means and said fourth sensor; and
    means for applying a first voltage across said circuit legs.

2. The firing circuit of claim 1 wherein said first and second resistors, and said third and fourth resistors, respectively, are of like nominal resistance.

3. The firing circuit of claim 1 wherein said first and third resistors, and said second and fourth resistors, respectively, are of like nominal resistance.

4. The firing circuit of claim 1 including means for diagnosing a fault in said firing circuit comprising
    means for reading the voltage potentials at a plurality of said junctions; and
    means for comparing the voltage potential at one of said junctions with the voltage potential at another of said junctions.

5. The firing circuit of claim 4 wherein said means for diagnosing said fault further comprises
    means for reading the voltage applied across said circuit legs;
    means for calculating a plurality of voltage ranges from the applied voltage and a plurality of known percentages of the applied voltage;
    means for comparing the voltage potential at one of said junctions with said voltage ranges.

6. The firing circuit of claim 4 wherein said means for diagnosing said fault further comprises
    means for applying a second voltage across said circuit legs greater than the first applied voltage, and
    means for comparing the voltage potential at one of said junctions when the first voltage is applied across said circuit legs with the voltage potential at said one of said junctions when the second voltage is applied across said circuit legs.

7. The firing circuit of claim 6 wherein said means for applying the first voltage across said legs comprises a battery, and said means for applying the second voltage across said circuit legs comprises a capacitor connected in parallel with said battery and means for charging said capacitor to the second voltage.

8. The firing circuit of claim 7 wherein said means for charging said capacitor comprises a transistor, the collector and emitter of said transistor being connected across said capacitor, the base of said transistor being connected to a current source, whereby said transistor charges said capacitor when a current is delivered from said current source to the base of said transistor.

9. The firing circuit of claim 4 including signal means for signalling the presence of aid fault upon the diagnosis thereof.

10. The firing circuit of claim 4 including means for recording said fault upon the diagnosis thereof.

11. The firing circuit of claim 10 wherein said recording means comprises a non-volatile memory unit.

12. The firing circuit of claim 11 including means for incrementing a counter in said memory unit each time said fault is diagnosed prior to the correction thereof.

13. The firing circuit of claim 4 wherein said means for diagnosing said fault further comprises
- means for determining the forward-biased conduction voltages of the diodes comprising said diode bridges;
- mean for calculating the voltage drop across each of said diode bridges; and
- means for comparing the voltage drop across each of said diode bridges with said diode forward-biased conduction voltages.

14. The firing circuit of claim 13 wherein said means for determining the forward-biased conduction voltages of the diodes comprises
- switchable means connected to said second junction on one of said circuit legs for draining current therefrom;
- means for reading the voltage potentials at said first and second junctions of said first circuit leg, and said first and second junctions of said second circuit leg, respectively, when said switchable mean is drawing current from said leg; and
- means for calculating the difference in the voltage potentials of said first and second junctions, and said third and fourth junctions, respectively, when said switchable means is drawing current from said leg.

15. The firing circuit of claim 4 including means for diagnosing a fault therein comprising
- a microprocessor having means thereon for reading the voltage potentials at a plurality of said junctions; and
- a set of instructions to be executed by said microprocessor comprising the steps of
  - reading the voltage potentials at a plurality of the junctions on said legs through the input ports of said microprocessor, and
  - comparing the voltage potentials at one of said junctions with the voltage potentials at another of said junctions.

16. The firing circuit of claim 15 including
- means on said microprocessor for reading said first voltage applied across said circuit legs, and
- means for providing a plurality of fault range percentage values to said microprocessor;
and wherein said microprocessor instructions further comprise the steps of
- reading the first voltage applied across said circuit legs,
- calculating a plurality of fault voltage ranges using said fault range percentage values and said first applied voltage, and
- comparing the voltage potential at one of said junctions with said fault voltage ranges.

17. The firing circuit of claim 16 wherein said means for providing said fault range percentage values comprises a memory unit connected with said microprocessor having said fault range percentage values stored therein, and wherein said microprocessor instructions further comprise the step of retrieving said fault range percentage values from said memory unit.

18. The firing circuit of claim 15 including means operable by said microprocessor for applying a second voltage across said circuit legs, said second applied voltage being greater than said first applied voltage; and wherein said set of microprocessor instructions further comprise the steps of
- storing the voltage potential at one of said junctions when said first voltage is applied across said circuit legs in a memory unit,
- operating said means for applying said second voltage when said second voltage is applied across said circuit legs,
- retrieving the voltage potential at said one of said junctions when said first voltage is applied across said circuit legs from said memory unit, and
- comparing the voltage potential at said one of said junctions when said first voltage is applied across said circuit legs with the voltage potential at said one of said junctions when said second voltage is applied across said circuit legs.

19. The firing circuit of claim 14 wherein said switchable means for drawing current from said second junction on one of said circuit legs comprises a
- a transistor, the collector of said transistor being connected to said second junction through a resistor of like nominal resistance as said shunting resistors of said leg, the emitter of said transistor being connected to location on said circuit leg having a zero voltage potential; and
- means for switchably delivering a current to the base of said transistor.

20. A firing circuit for actuating a plurality of instrumentalities of a vehicle passenger restraint system comprising
- a first circuit leg comprising in series a first normally open sensor for detecting a first condition requiring actuation of said instrumentalities, trigger means having an internal for actuating said instrumentalities and a second normally open sensor for a second condition requiring actuation of said instrumentalities, said first and second sensor being shunted by a first and second resistor, respectively, each having a resistance substantially greater than the internal resistance of said trigger means:
- a second circuit leg connected in parallel with said first circuit leg comprising in series a third normally open sensor for detecting the first condition requiring actuation of said instrumentalities and a third resistor having a resistance substantially greater than the internal resistance of said trigger means:
- a third circuit leg connected in parallel with said first and second circuit legs comprising in series a fourth resistor and a fourth normally open sensor for detecting the second condition requiring actuation of said instrumentalities, said fourth resistor having a resistance substantially greater than the resistance of said trigger means;
- a first diode bridge comprising a pair of oppositely biased diodes connecting a first junction on said first circuit leg between said first sensor and said trigger means with a junction on said second circuit leg between said third sensor and said third resistor; and
- a second diode bridge comprising a pair of oppositely biased diodes connecting a second junction on said first circuit leg between said first trigger means and said second sensor thereof with a junction on said third circuit leg between said fourth resistor and said fourth sensor; and
- means for applying a first voltage across said circuit legs.

21. The firing circuit of claim 20 wherein said first and second resistors, and said third and fourth resistors, respectively, are of like nominal resistance.

22. The firing circuit of claim 20 wherein said first and third resistors, and said second and fourth resistors, respectively, are of like nominal resistance.

* * * * *

UNITED STATES PATENT OFFICE
CERTIFICATE OF CORRECTION

PATENT NO. : 4,851,705                Page 1 of 2

DATED : July 25, 1989

INVENTOR(S) : Kevin E. Musser et al

It is certified that error appears in the above-identified patent and that said Letters Patent is hereby corrected as shown below:

Col. 2, line 2, after "elements" insert a period (.)
Col. 4, line 19, after "larger" delete the period (.)
Col. 5, line 44, "51" should be --54--.
Col. 6, Table I, Fault Range delineation lines missing,
        Range 5 delineates Fault Nos. 1 - 11
        Range 4 delineates Fault Nos. 12 - 14
        Range 3 delineates Fault Nos. 15 - --
        Range 2 delineates Fault Nos. 18 - 20
        Range 1 delineates Fault Nos. 21 - 26

Col. 7, line 36, "ad" should be --and--.
Col. 7, line 38, "no 8" should be --no. 8--
Col. 7, line 48, "4" should be --54--
Col. 7, line 60, "Table II" should be --Table I--
Col. 8, line 28, the hyphen (-) should be a semi-colon (;)
Col. 8, line 30, "no 3" should be --no. 3--
Col. 9, line 45, "microprocesor" should be --microprocessor--
Col. 9, line 64, "n" should be --no--
Col. 10, line 57, "lens" should be --legs--

UNITED STATES PATENT AND TRADEMARK OFFICE
CERTIFICATE OF CORRECTION

PATENT NO. : 4,851,705

DATED : July 25, 1989

INVENTOR(S) : Kevin E. Musser, et al

It is certified that error appears in the above-identified patent and that said Letters Patent is hereby corrected as shown below:

```
Col. 11, line 26, "forcing" should be --firing--
Col. 11, line 49 (Claim 1), after "for" insert --detecting--
Col. 11, line 62 (Claim 1), after "sensor" insert --for--
Col. 12, line 60 (Claim 9), "aid" should be --said--
Col. 13, line 15 (Claim 14), "draining" should be --drawing--

Col. 14, line 28 (Claim 20), after "internal" insert
         --resistance--
Col. 14, line 30 (Claim 20), after "for a" insert --detecting--
```

Signed and Sealed this

Twenty-third Day of October, 1990

Attest:

HARRY F. MANBECK, JR.

*Attesting Officer*     *Commissioner of Patents and Trademarks*